US006948357B1

(12) United States Patent
Chang

(10) Patent No.: US 6,948,357 B1
(45) Date of Patent: Sep. 27, 2005

(54) CAM SHAFT INTAKE ANGLE EXAMINING DEVICE

(76) Inventor: Wen-Tsun Chang, No.56, Lane 47, Ser-Pie Rd., Hong-Yuan City, Tai-Chung Hsien (TW)

( * ) Notice: Subject to any disclaimer, the term of this patent is extended or adjusted under 35 U.S.C. 154(b) by 0 days.

(21) Appl. No.: 10/793,917

(22) Filed: Mar. 8, 2004

(51) Int. Cl.[7] .............................................. G01M 15/00
(52) U.S. Cl. ....................................... 73/116; 73/119 R
(58) Field of Search ............................... 73/116, 117.2, 73/117.3, 118.1, 119 R

(56) References Cited

U.S. PATENT DOCUMENTS

| | | | | |
|---|---|---|---|---|
| 5,715,780 A * | 2/1998 | Haller | 123/90.17 |
| 5,827,954 A * | 10/1998 | Noland | 73/116 |
| 6,035,707 A * | 3/2000 | Main | 73/116 |
| 6,041,647 A * | 3/2000 | Matsuoka | 73/116 |
| 6,272,910 B1 * | 8/2001 | Noland | 73/116 |
| 6,324,902 B1 * | 12/2001 | Kang | 73/116 |
| 6,612,162 B2 * | 9/2003 | Han et al. | 73/117.3 |
| 2004/0074289 A1 * | 4/2004 | Galtier | 73/116 |

* cited by examiner

*Primary Examiner*—Eric S. McCall
(74) *Attorney, Agent, or Firm*—Birch, Stewart, Kolasch & Birch, LLP

(57) ABSTRACT

An intake angle examining device for an engine cam shaft includes a base adapted for receiving the engine, a measuring disk pivotally connected to the base for allowing the cam shaft to extend therethrough and an adjusting rod extendable into a cylinder of the engine to secure the cam shaft. The engine to be tested is secured in the base and the cam shaft is extended through and secured in the rotation disk. he adjusting rod is extended into the cylinder to fix the cam shaft and is removed when the engine is tested.

10 Claims, 6 Drawing Sheets

CAM SHAFT INTAKE ANGLE EXAMINING DEVICE

BACKGROUND OF THE INVENTION

1. Field of the Invention

The present invention relates to a cam shaft intake angle examining device, and more particularly to a diesel engine cam shaft intake angle examining device such that the intake stroke is able to precisely coordinate with different strokes of the engine.

2. Description of Related Art

An engine provides power to vehicle, vessels and aircraft so that all these different transporting bodies are able to move. Based on the fuel consumed, some are gasoline engines and the other diesel engines. Based on the number of strokes each cycle, some engines are four-stroke engines and some two-stroke engines. As is generally known, the four strokes of the engine are intake, compression, explosion and exhaust. Thus, it is to be noted that the intake and exhaust occur at the same time to the diesel engine. Therefore, observation of the activation/deactivation of the intake and the traveling distance of the piston is able to have the intake angle after calculation. However, the current calculation technique is too troublesome and wastes too much time.

The current technique requires the user to rotate the cam shaft first. Since the rotation of the cam shaft drives the piston, observation of the activation/deactivation of the intake angle and measurement of the piston traveling distance is able to have the intake angle. As stated earlier, this technique takes too much time and involves a lot of manual energy.

To overcome the shortcomings, the present invention intends to provide an improved examining device to mitigate the aforementioned problems.

SUMMARY OF THE INVENTION

The primary objective of the invention is to provide an improved cam shaft intake angle examining device to fast measure the intake angle so as to save time and manual energy.

Another objective of the invention is that during the measurement of the intake angle, observation of the piston movement is able to fix the intake angle to coordinate with the cam shaft rotation.

Other objects, advantages and novel features of the invention will become more apparent from the following detailed description when taken in conjunction with the accompanying drawings.

DETAILED DESCRIPTION OF PREFERRED EMBODIMENT

Figure 1:
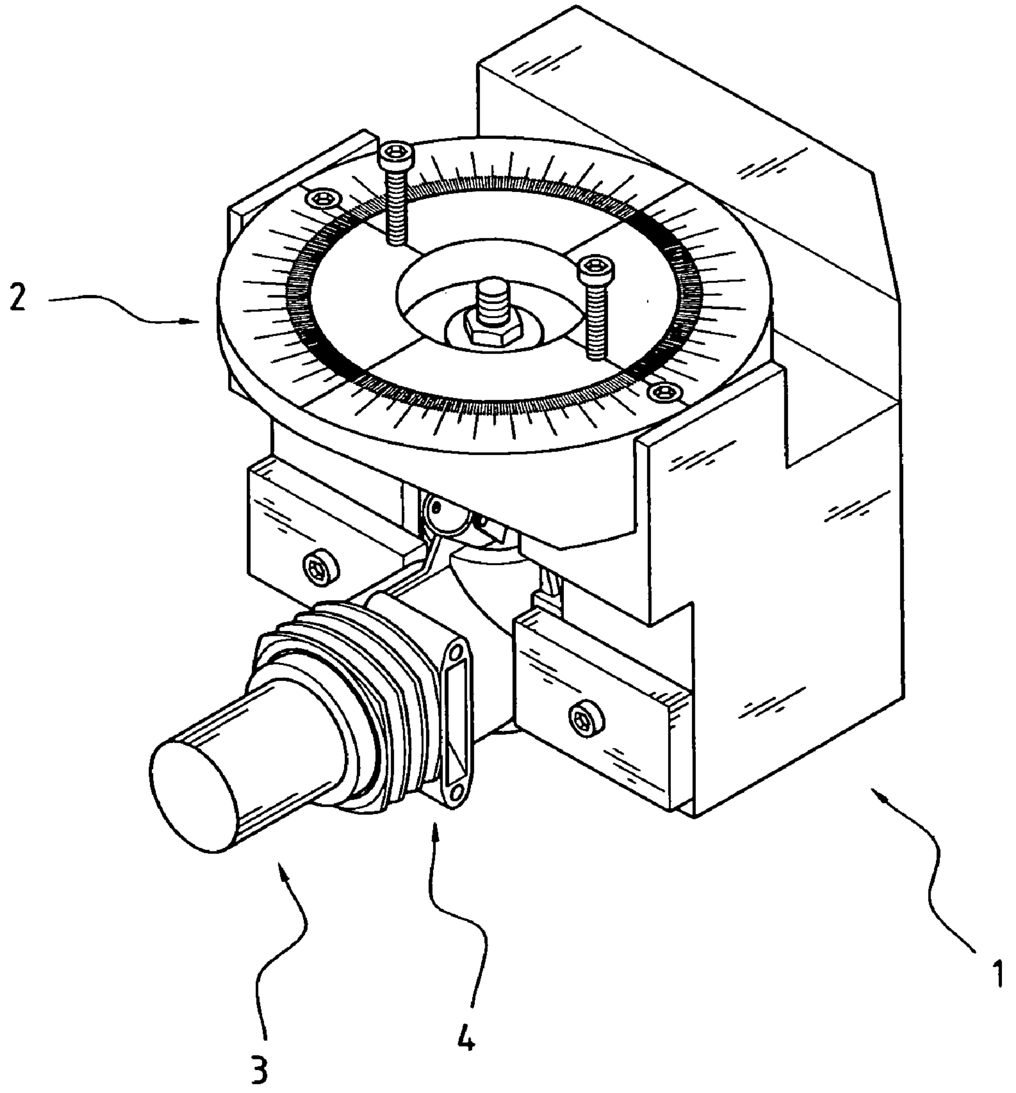
FIG. 1 is a schematic perspective view showing an examining device of the present invention in corporation with an engine in question.
Figure 2:
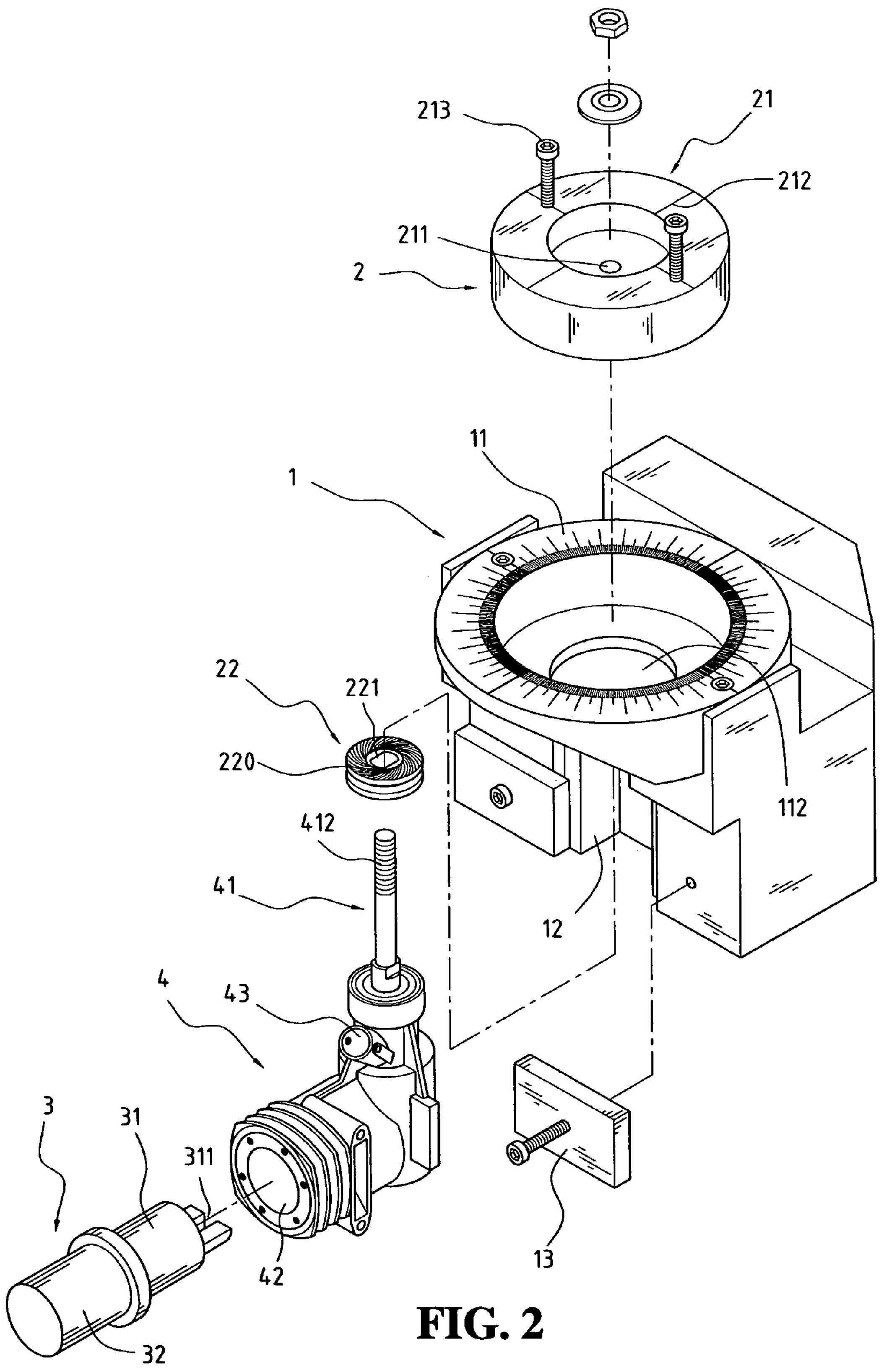
FIG. 2 is an exploded perspective view showing the structure of the examining device of the present invention.

With reference to FIGS. 1 and 2, a cam shaft intake angle examining device in accordance with the present invention includes a base 1, a measuring disk 2, and an adjusting rod 3. The engine 4 with a cam shaft 41 to be tested is a two-stroke diesel engine. The engine 4 is first secured in the base 1. The adjusting rod 3 is used to position the cam shaft 41 at an initial position (0 point). A connecting block 22 is placed on the cam shaft 41. A rotation disk 21 is measured and fixed on the connecting block 22. After the adjusting rod 3 is taken away from the base 1, the engine 4 is ready for test.

The base 1 is defined with a fixing recess 12. The fixing recess 12 is so defined that it is adapted to mate with the shape of the cam shaft 41. The base 1 further has a ring 11 with scales that has a prevision of 0.1 degrees. A fixing hole 111 is defined in the ring 11 and a connecting hole 112 is defined in a bottom defining the fixing hole 111 to communicate with the connecting hole 112. A positioning device is provided in the base 1 to fix the engine 4. In this embodiment, the positioning device is a combination of a pressing block and a bolt 13. The pressing block 13 is applied to abut an outer appearance of the engine 4 and then the bolt is supplied to extend through the pressing block and into the base 1 so that the engine 4 to be tested is fixed on the base 1.

The measuring disk 2 includes a rotation disk 21 and a connecting block 22. The rotation disk 21 has a cam shaft hole 211 to correspond to the cam shaft 41. A marking cross 212 is formed on a top face of the rotation disk 21 to coordinate with the scales of the ring 11. A rotation handle 213 is formed on the rotation disk 21 to facilitate the rotation of the rotation disk 21.

The connecting block 22 has a rough surface 220 to increase the friction with the rotation disk 21 such that relative movement between the connecting block 22 and the rotation disk 21 is prevented. The connecting block 22 has a cam shaft fixing ring to adapt to the shape of the engine cam shaft 41. A cam shaft extension hole 221 is defined in the connecting block 22. A circular recess is defined in both sides of the connecting block 22 to mate with the output end 412 of the cam shaft 41.

The adjusting rod 3 is provided to ensure that the tested engine is at the initial position before the test begins. In this embodiment, the initial position is the same as the top dead point of the piston. The adjusting rod 3 is a rod with different diameters. The adjusting rod 3 has a first end 31 with a diameter the same as that of the piston of the engine 4 in question. The first end 31 has a recess 311 corresponding to the linkage pin. A contacting face 312 is formed adjacent to the recess 311. A second end 32 is formed opposite to the first end 31 for easy holding of the adjusting rod 3.

Figure 3:
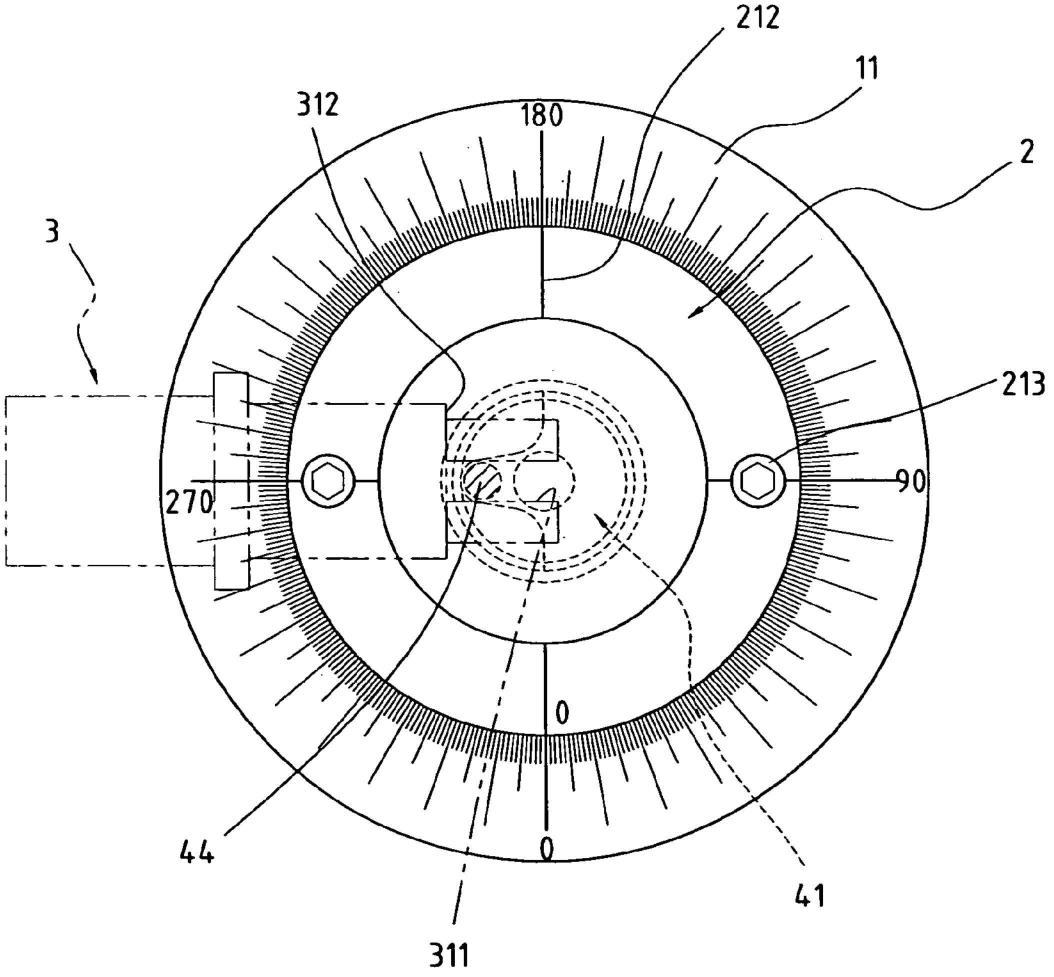
FIG. 3 is a top plan view of the examining device of the present invention.
Figure 4:
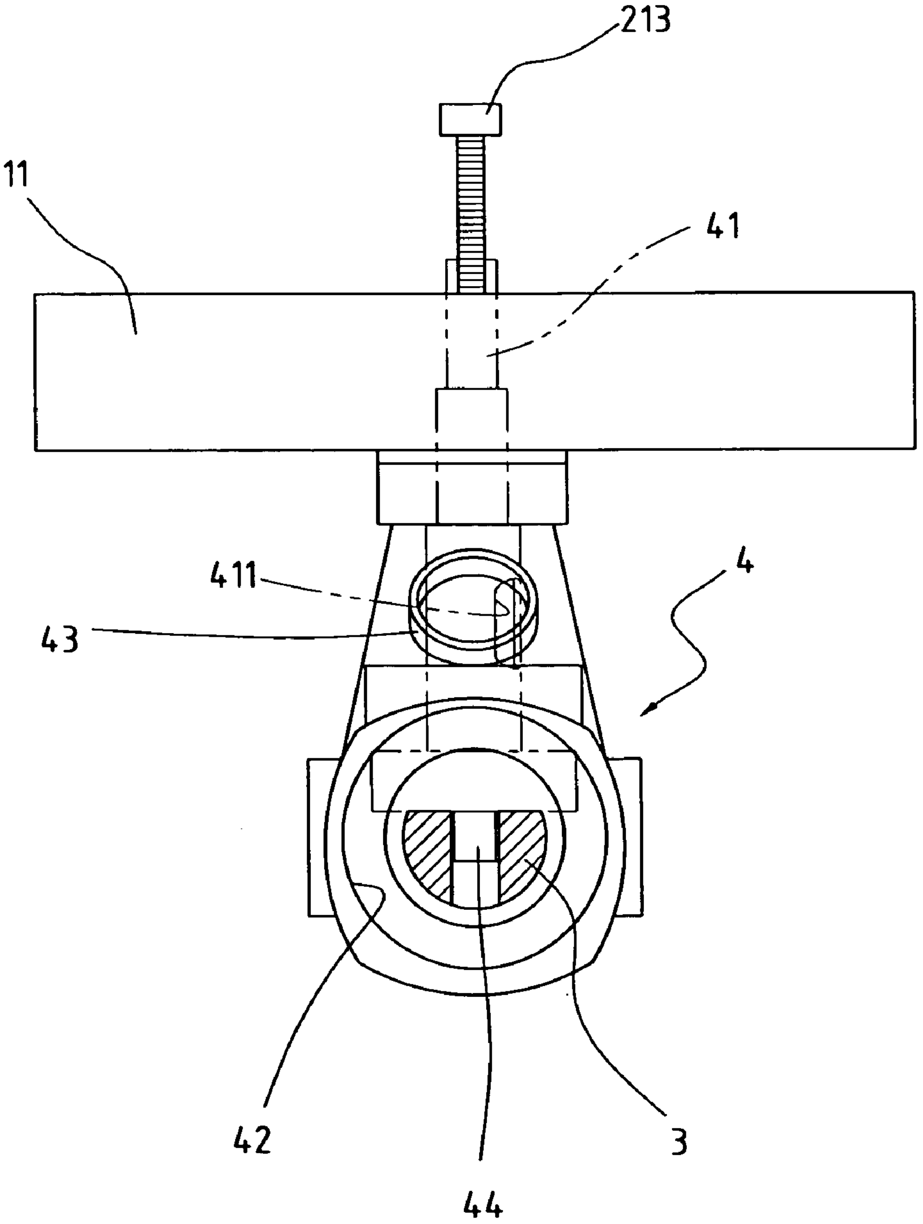
FIG. 4 is a front plan view of the examining device of the present invention.

Before the test starts, it is to be noted that the hull of the engine 4 is to be used so that only the hull and the cam shaft 41 of the engine 4 are left for test. With reference to FIGS. 3 and 4, first, the engine 4 is placed in the fixing recess 12 of the base 1 and then the bolt of the positioning device is used to extend through the pressing block 13 to secure the engine 4 in the fixing recess 12 of the base 1. The output end 412 of the cam shaft 41 extends through the cam shaft extension hole 221 of the connecting block 22 with the rough surface 220 facing upward. The output end 412 of the cam shaft 41 is then extended through the cam shaft hole 211 of the rotation disk 21. Rotation of the cam shaft 41 allows the linkage pin 44 at a position the same as the top dead end of the piston. The adjusting rod 3 is extended into the cylinder 42 of the engine 4 to allow the linkage pin 44 to be received in the recess 311. Meantime, the linkage pin 44 engages with the contacting face 312. An intake 411 may be seen from the fuel entrance 43 of the engine.

Figure 5:
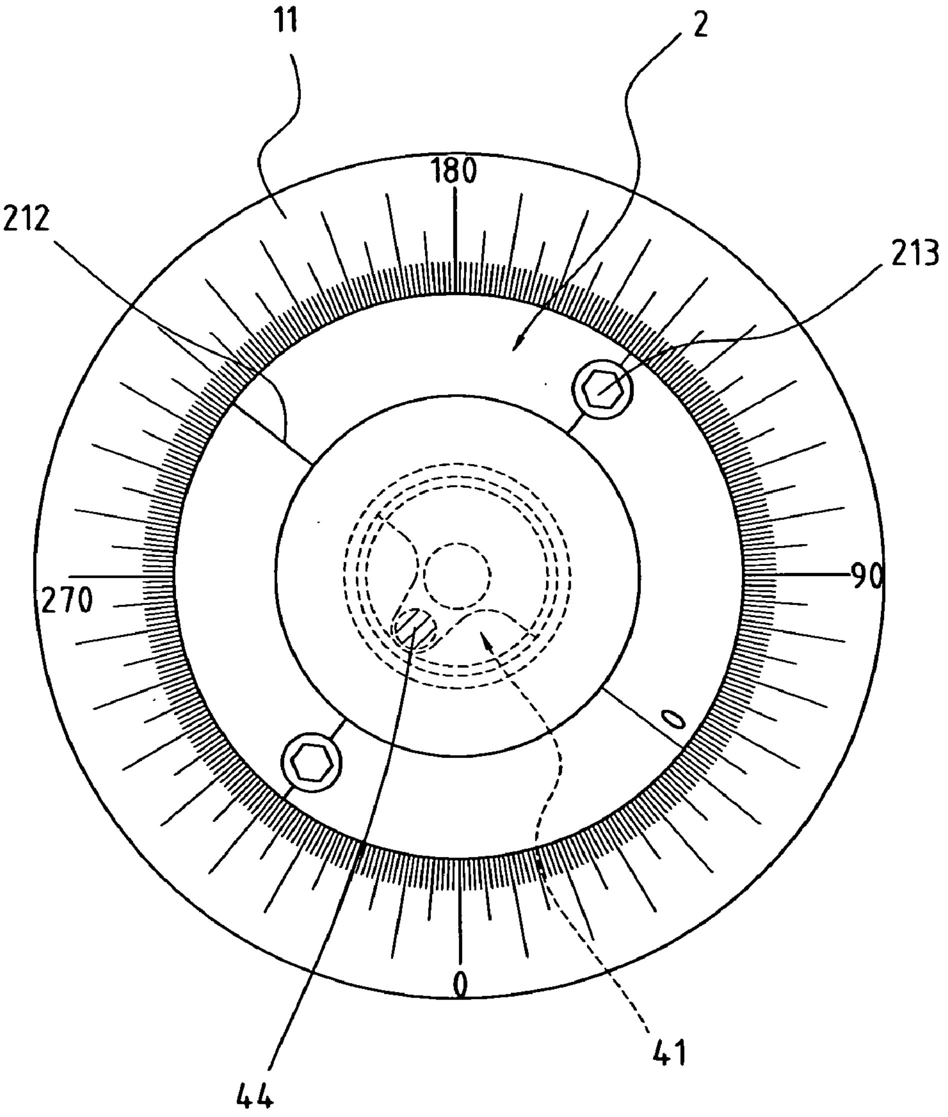
FIG. 5 is a schematic top plan view showing the application of the examining device.
Figure 6:
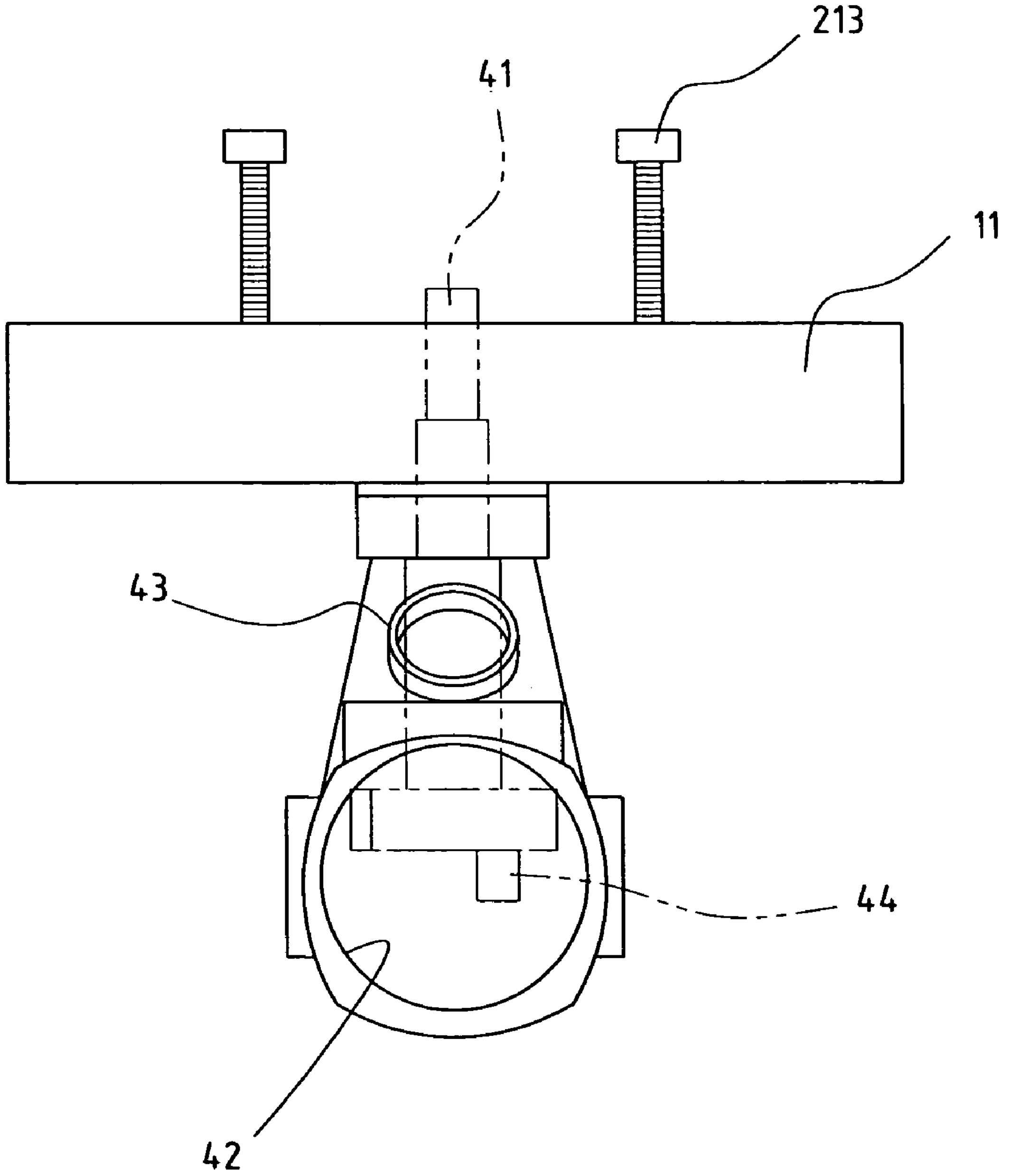
FIG. 6 is a schematic front plan view showing the application of the examining device of the present invention.

Adjusting the rotation disk 21 to allow the marking cross 212 aligned with the ring scale initial point. Then a nut (not numbered) is supplied to secure the output end 412 and thus the connecting block 22 is secured on the rotation disk 21. Therefore, the cam shaft 41, the connecting block 22 and the rotation disk 21 are able to move simultaneously. With reference to FIGS. 5 and 6, after the adjusting rod 3 is removed, the rotation disk 21 is rotated using the rotation handle 213. The fuel entrance 43 is used as a standard of measuring the cam shaft intake 411. Using the rotation disk 21 and the scale of the ring 11 is able to readily measure the intake angle.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An intake angle examining device for an engine cam shaft, the intake angle examining device comprising:

a base adapted for receiving the engine;

a measuring disk pivotally connected to the base for allowing the cam shaft to extend therethrough; and an adjusting rod extendable into a cylinder of the engine to secure the cam shaft, whereby the engine to be tested is secured in the base and the cam shaft is extended through and secured in the rotation disk, the adjusting rod is extended into the cylinder to fix the cam shaft and is removed when the engine is tested.

2. The examining device as claimed in claim 1, wherein the base has a ring.

3. The examining device as claimed in claim 1, wherein the base has a fixing recess.

4. The examining device as claimed in claim 1, wherein the base has a positioning device for fixing the engine.

5. The examining device as claimed in claim 4, wherein the positioning device is a combination of a pressing block and a bolt.

6. The examining device as claimed in claim 1, wherein the measuring disk includes a rotation disk and a connecting block.

7. The examining device as claimed in claim 6, wherein a marking cross is defined in a top face of the measuring disk.

8. The examining device as claimed in claim 6, wherein the measuring disk has a rotation handle.

9. The examining device as claimed in claim 6, wherein the connecting block has a rough surface on a side face of the connecting block.

10. The examining device as claimed in claim 1, wherein the adjusting rod has a recess adapted to correspond to a linkage pin of the engine.

* * * * *